United States Patent [19]

Karstensen et al.

[11] 4,086,759
[45] May 2, 1978

[54] GAS TURBINE SHAFT AND BEARING ASSEMBLY

[75] Inventors: Karl W. Karstensen; LeRoy R. Thompson, both of Peoria; James F. Wenninger, Morton, all of Ill.

[73] Assignee: Caterpillar Tractor Co., Peoria, Ill.

[21] Appl. No.: 728,587

[22] Filed: Oct. 1, 1976

[51] Int. Cl.² ............................................. F02C 7/06
[52] U.S. Cl. .................................. 60/39.08; 415/112; 184/6.11
[58] Field of Search ............... 60/39.08; 415/111, 112, 415/170 R, 172 A, 173 R, 189, 190, 110; 184/6.11; 308/187.2

[56] References Cited

U.S. PATENT DOCUMENTS

| | | | |
|---|---|---|---|
| 2,951,337 | 9/1960 | Atkinson et al. | 60/39.08 |
| 3,133,693 | 5/1964 | Holl | 415/112 |
| 3,135,562 | 6/1964 | Davies et al. | 415/170 R |
| 3,264,043 | 8/1966 | Keen | 184/6.11 |
| 3,347,553 | 10/1967 | Schweiger | 184/6.11 |
| 3,382,670 | 5/1968 | Venable | 184/6.11 |
| 3,748,058 | 7/1973 | Bouillen et al. | 415/170 R |
| 3,890,780 | 6/1975 | Hagemeister et al. | 60/39.08 |

*Primary Examiner*—Carlton R. Croyle
*Assistant Examiner*—L. J. Casaregola
*Attorney, Agent, or Firm*—Phillips, Moore, Weissenberger, Lempio & Majestic

[57] ABSTRACT

A turbine shaft and bearing assembly for a gas turbine is positionable as a unit in a turbine housing while providing means for lubrication of the associated bearings and means for communicating cooling fluid to the associated turbine wheel. The turbine shaft and bearing assembly which is the subject of this invention is applicable in one embodiment to a gasifier turbine housing or in another embodiment to a power turbine housing.

15 Claims, 5 Drawing Figures

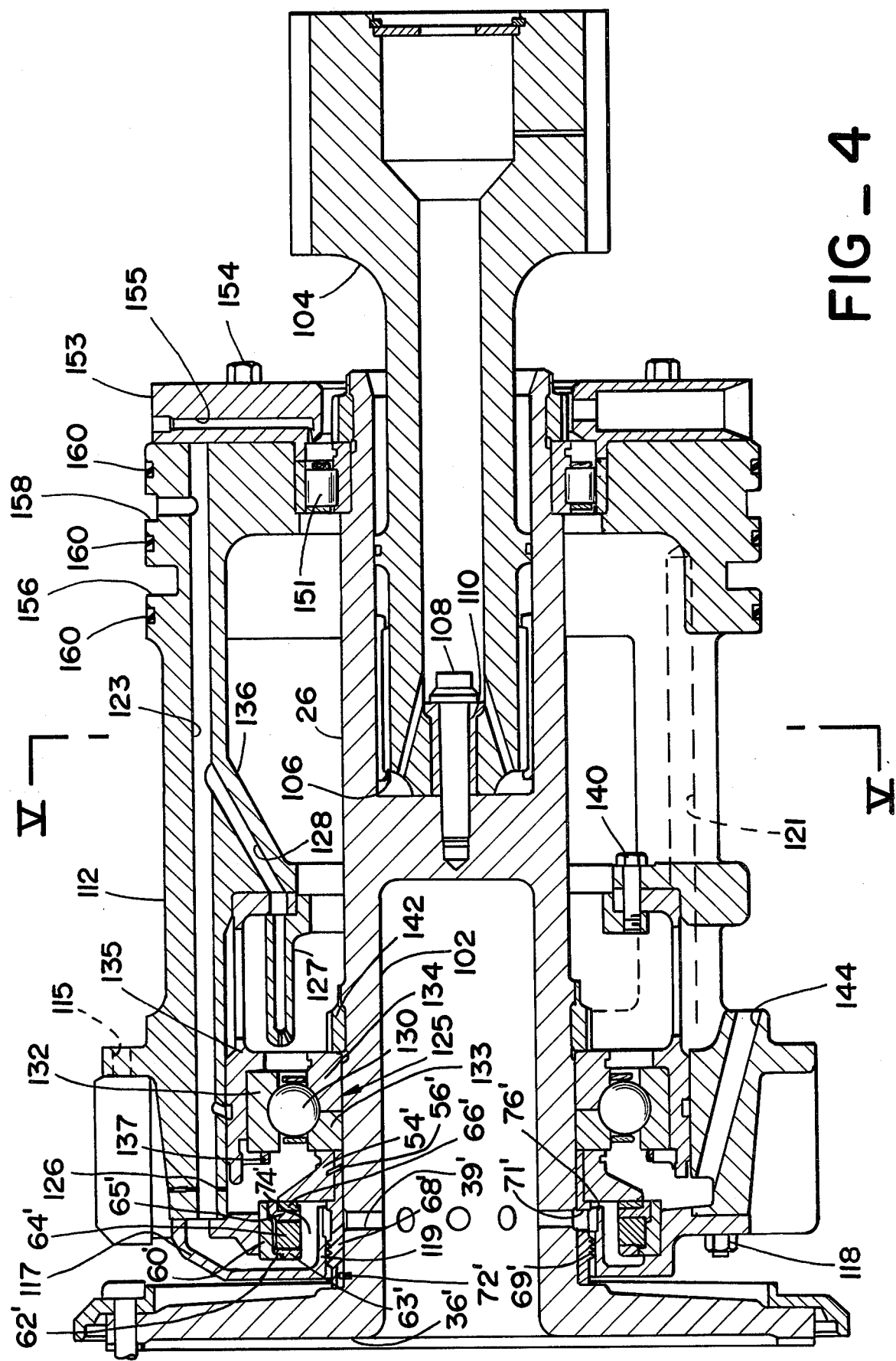

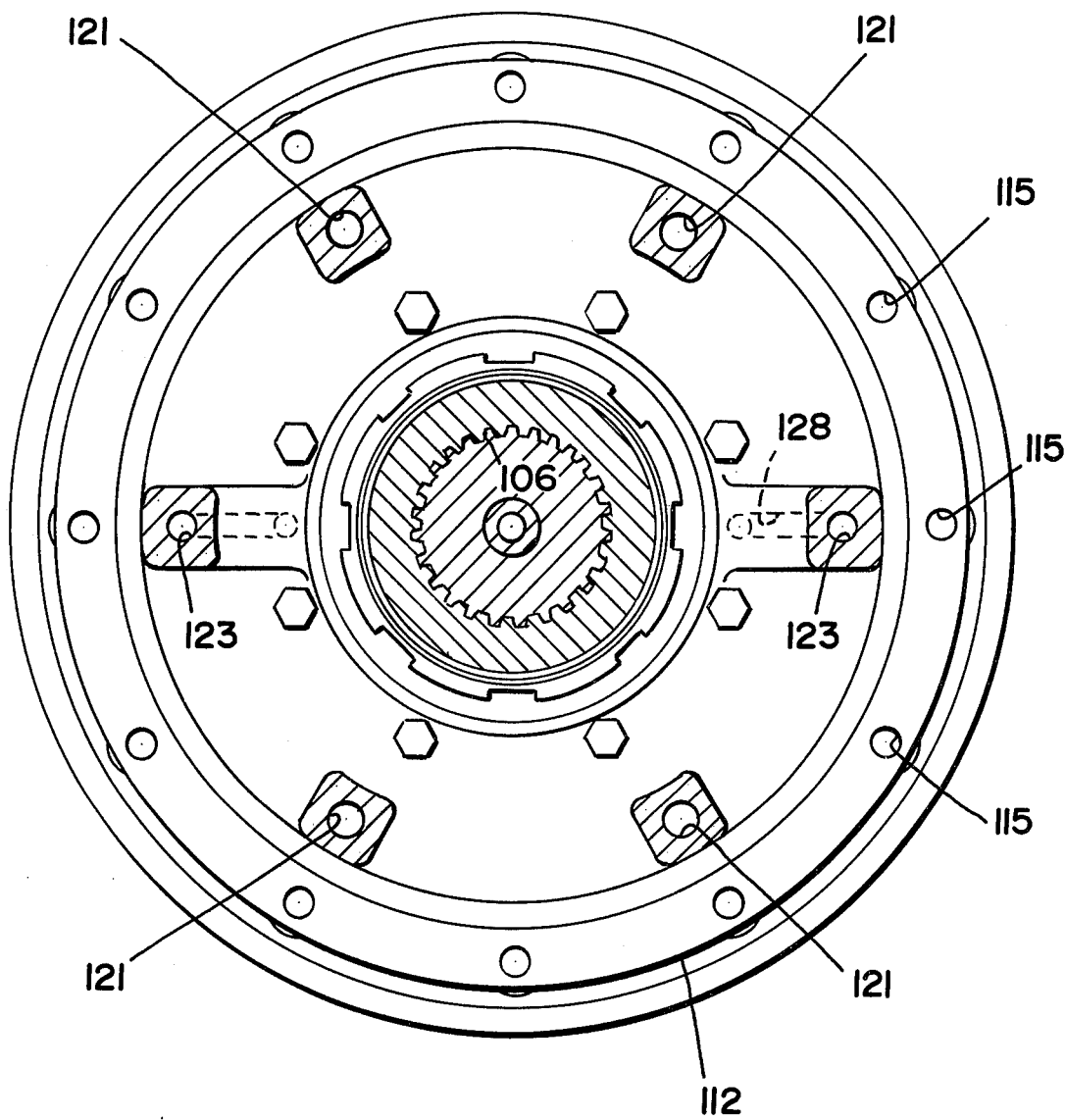
FIG _ 5

GAS TURBINE SHAFT AND BEARING ASSEMBLY

BACKGROUND OF THE INVENTION

This invention relates to a gas turbine engine, more particularly modular gas turbine engines which include a compressor and gasifier module, a turbine case module and a power output module. This type of gas turbine engine may be disassembled into the three major components with the compressor and gasifier turbine wheel remaining with the compressor and gasifier section while the power output turbine wheel remains with the power output module. The case, constituting the third portion of the turbine, interconnects the compressor and gasifier turbine section with the power output section. Assembly of this gas turbine engine is the subject of U.S. patent application, Ser. No. 630,476, now U.S. Pat. No. 4,030,288 and the Continuation-in-Part filed therefrom both assigned to the assignee of this application.

The assembly of gas turbines has taken many forms, as discussed in the above-mentioned case. One particular problem encountered in assembly involves the installation of turbine shafts in the various modules. In particular, the gasifier turbine shaft must be installed in the compressor and gasifier turbine section and the power turbine shaft must be installed in the power turbine section prior to assembly of the engine. However, to fixedly rotatably associate the shafts with the associated sections, it has been necessary to work in extremely confined spaces for the installation of retaining nuts and bearings associated with the shaft. To work in such confined spaces not only is difficult, it also raises the concomitant problem of alignment of the shafts which is so critical in high speed gas turbine engines of the type described herein. To compound the problem, quite frequently a part or a tool is dropped in the turbine case. Due to the confined spaces, it has been found extremely difficult to retrieve such dropped parts or tools. In some cases it has become necessary to completely disassemble the engine to retrieve lost parts and tools.

Lubrication of the bearing associated with a turbine shaft in either the compressor and gasifier module or the power turbine module is particularly important. The problem of lubrication is compounded by the heat which is inherent in all gas turbine engines. It is to be understood that the heat in the gasifier section is, of course, considerably higher than that found in the power turbine section, although the problems are similar. It is well-known that efficient operation of the turbine is dependent upon extremely high temperatures in the gasifier turbine section itself. However, to increase the temperatures beyond a certain point may cause failure of the various component parts of the turbine with disastrous results. Various schemes to provide cooling fluid, such as compressed air to the turbine wheel, have been disclosed. However, in most cases the cooling method relates to axial flow compressors wherein the gasifier turbine shaft is of hollow construction and cooling air may be communicated therein directly from the compressor section. In turbine engines with radial flow compressors such as that disclosed herein, the compressor turbine shaft, or in the power section the power shaft, is generally solid. Therefore, it has proved difficult to communicate cooling fluid to or near the center of rotation of the shaft to be deflected radially outwardly of the shaft for cooling of the various rotating parts associated with the turbine wheel.

To provide both lubrication and cooling fluid at generally the same locale on the turbine shaft poses a particularly difficult problem.

SUMMARY OF THE INVENTION

Accordingly, this invention provides a turbine shaft and bearing assembly which, if used in the gasifier turbine enables the gasifier turbine shaft and wheel flange and bearing assembly to be assembled with the gasifier and compressor section as a unit. Similarly, if the construction is used in the power turbine, the power turbine shaft, wheel flange and bearing assembly may be assembled with the power turbine section as a unit. The bearing assembly and turbine shaft is provided with integral passages for communicating lubrication fluid to the associated bearing and integral passages for communicating cooling fluids such as compressed air to the vicinity of the turbine shaft. Particularly advantageous are "plug-in" type connectors for communicating lubricating fluid to at least one embodiment of this invention. In a second embodiment, lubricating fluid and cooling fluid are provided by means of annular grooves formed about the bearing cage. Due to the high temperatures involved in operating the assembly, especially adapted sealing techniques are used to retain the lubricating fluid in the vicinity of the bearing while separating the cooling fluid from the lubricating fluid.

It is a particular object of this invention to provide a separable turbine shaft and bearing assembly for utilization in a gas turbine.

It is another object of this invention to provide a turbine shaft and bearing assembly which, while being easily separable from the associated module, includes lubrication fluid passages.

It is still another object of this invention to provide a turbine shaft and bearing assembly which includes cooling fluid passages.

It is another object of this invention to provide a turbine shaft and bearing assembly in which the turbine shaft defines an axial cavity for cooling purposes.

It is still a further object of this invention to provide a turbine shaft and bearing assembly in which the turbine shaft may be relatively easily removed from the bearing assembly.

Broadly stated, the invention is a turbine shaft bearing assembly in a gas turbine. The gas turbine includes a turbine section in a casing with a turbine section having a first end and a second end. The turbine section is removably fixable within the casing at its first end and includes lubrication conduits. The turbine shaft and bearing assembly includes a shaft defining a turbine wheel mounting flange at one end. The flange is adapted for the mounting of a turbine wheel. A bearing assembly rotatably fixes the shaft in the turbine section at its first end. The bearing assembly includes a bearing cage removably fixable axially in the first end of the turbine section. Bearings rotatably fix the shaft in the bearing cage while lubrication fluid passages provide lubrication fluid to the bearings. A lubrication fluid socket assembly is formed with the bearing cage for sealingly receiving fluid from the lubrication conduits of the turbine section. First and second seals are provided for sealingly associating the shaft with the cage. The first and second seals are disposed between the bearings and the flange and form an annular cavity therebetween. The turbine shaft bearing assembly further includes passages and the like for providing cooling fluid to the annular cavity.

These objects and other objects of the invention will become apparent from a study of the following specification and the accompanying drawings.

BRIEF DESCRIPTION OF THE DRAWINGS

FIG. 4 depicts the power turbine section of the turbine illustrated in FIG. 2 incorporating the provisions of this invention in the power turbine shaft and bearing assembly.

FIG. 5 is a sectional view taken at line V—V of FIG. 4 of the power turbine shaft and bearing assembly.

DETAILED DESCRIPTION OF THE PREFERRED EMBODIMENT

Figure 1:
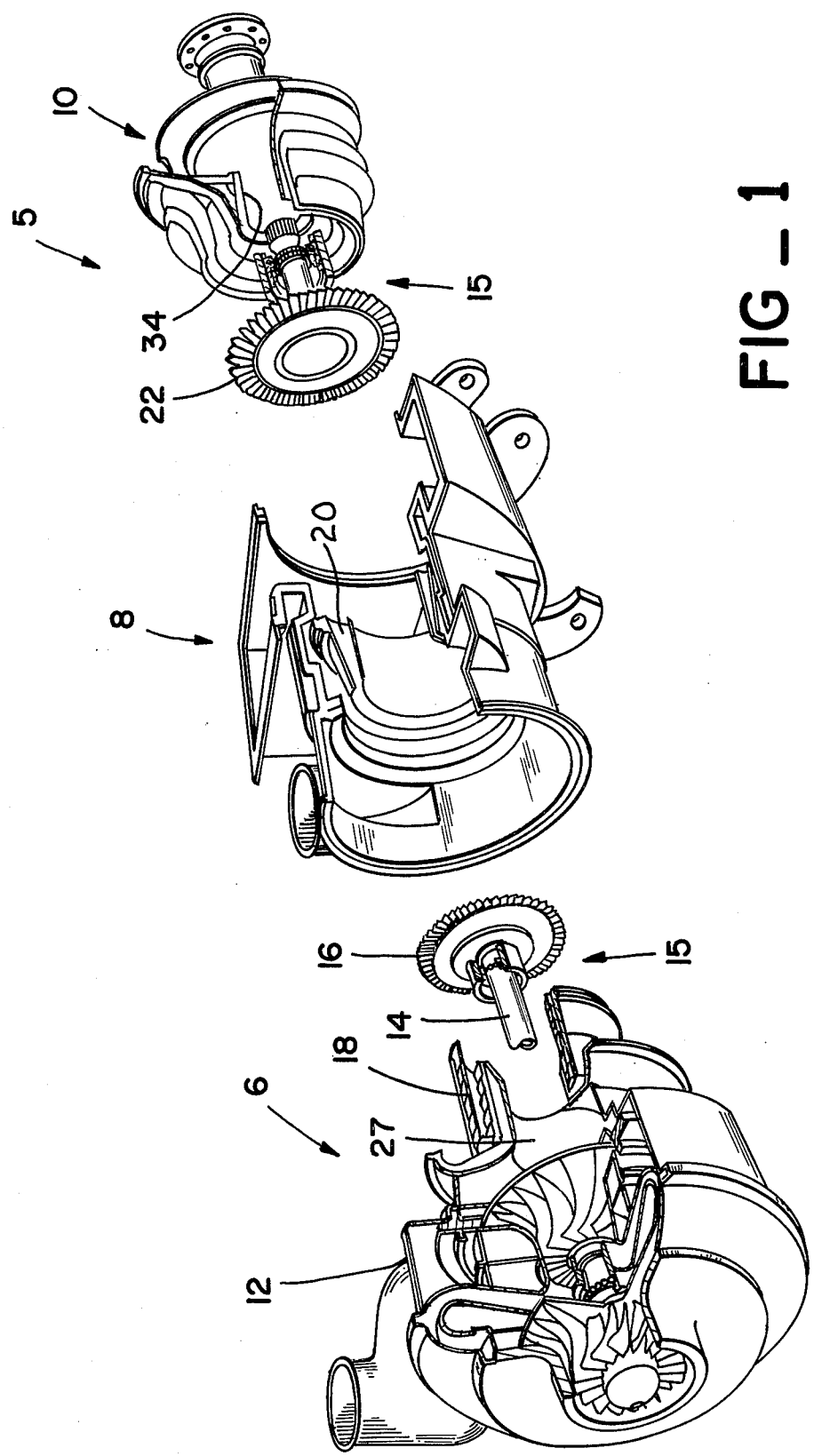
FIG. 1 is an exploded view of a gas turbine in which the gasifier turbine and the power turbine are each removable as a unit.

An exploded view of a gas turbine 5 for use in stationary power applications is illustrated in FIG. 1. This gas turbine incorporates the structural features of this invention in two embodiments. The gas turbine 5 shown in FIG. 1 is comprised of three basic modules, a compressor and gasifier module 6, a turbine casing module 8, and a power module 10. Although the principles of gas turbine engines are well-known in the art, it is appropriate to comment on the features illustrated in FIG. 1. The compressor and gasifier module 6 includes a two stage radial compressor 12 which is driven by turbine shaft 14 shown here in the exploded view withdrawn from the compressor and gasifier module. Turbine shaft 14 has mounted thereon a turbine wheel 16 which is driven by hot gasses impinging on a plurality of turbine blades mounted about the perimeter of the turbine wheel. The hot gasses emanate from an annular combustor 18 located radially about the turbine shaft 14. Compressed air from compressor 12 is fed to the annular combustor 18 wherein fuel is injected and ignited. The hot gasses, after driving turbine wheel 16, pass through an annular chamber 20 in turbine casing 8 to impinge on power turbine wheel 22 mounted in power module 10 to drive an appropriate driven member such as a planetary reduction section. Such driven members can include electric generators (not shown) driven through the planetary gear section 24 illustrated in part in FIG. 2.

Figure 2:
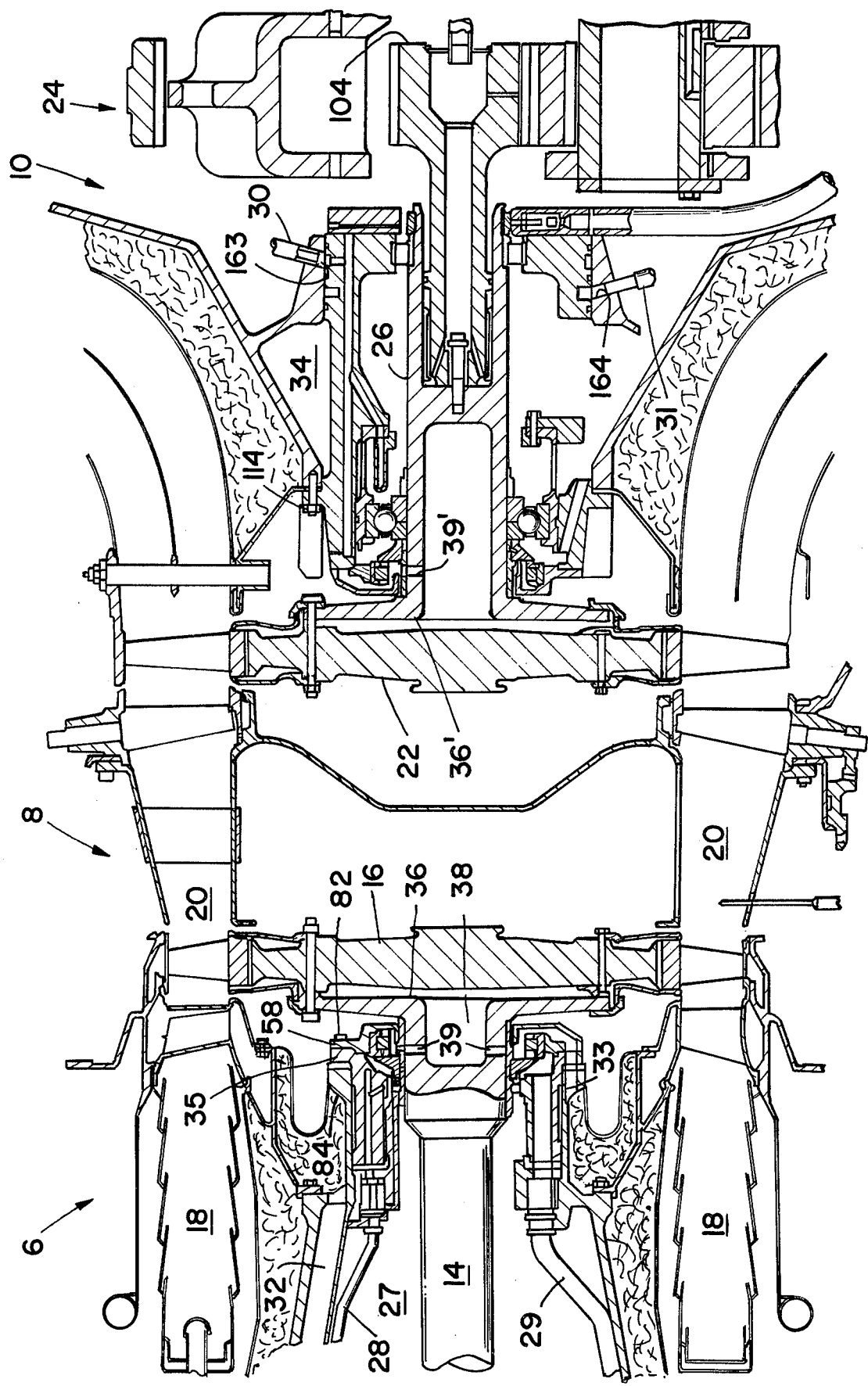
FIG. 2 depicts a portion of the gas turbine shown in FIG. 1 partly in section with the modular sections connected and the turbine shafts and bearing assemblies installed therein.

Referring now to FIG. 2, a portion of the gas turbine 5 shown in FIG. 1 is shown in section in FIG. 2 to particularly point out the features of the turbine shaft and bearing assembly which is the subject of this invention. In FIG. 2 compressor and gasifier module 6 is interconnected with turbine casing 8 which in turn is interconnected with power module 10 in accordance with the structure disclosed in U.S. patent application Ser. No. 630,476. In FIG. 2 the axial nature of the gasifier turbine and power turbine is readily apparent, with gasifier turbine wheel 16 downstream of annular combustor 18, and the annular chamber 20 interconnecting with the power turbine wheel 22. It is emphasized that there is no structural interconnection between turbine shaft 14 and power turbine 22, rotation being imparted to turbine wheel 22 through expanding gasses passing through annular chamber 20. The particular problem involved in assembling gas turbines of this design occurs upon installation of turbine shaft 14 and the counterpart power turbine shaft 26. The structure of the gas turbine requires that these shafts be inserted inwardly into cavity 27 of the compressor and gasifier module and inwardly into cavity 34 of the power module, as illustrated in FIG. 1. The retaining features of present gas turbines require the installer to reach inwardly into these cavities in the compressor and gasifier module or the power module to place the necessary bearing assemblies and retaining nuts on the shafts. It is apparent from FIG. 2 that interconnection of the lubrication lines 28, and lubrication return line 29 with the bearing assembly, posed a particularly difficult problem. At the opposite end, in the power module the corresponding lubrication line 30 and cooling fluid line 31 posed similar problems. As can be seen in FIG. 2, lubrication line 30 and cooling fluid line 31 are now clear of the bearing assembly and the vicinity of the turbine wheel, while lubrication line 28 and lubrication return line 29 in the compressor and gasifier module, although still in the cramped area of the bearing, have been adapted to "plug" into appropriate passages of the assembly to establish a substantially oil tight connection therebetween. Cooling fluid is provided to the gasifier turbine through the integral passages 32 formed in the compressor and gasifier module which in turn lead to passages 33 in the bearing assembly. A more detailed explanation of the cooling fluid passages is forthcoming.

Figure 3:
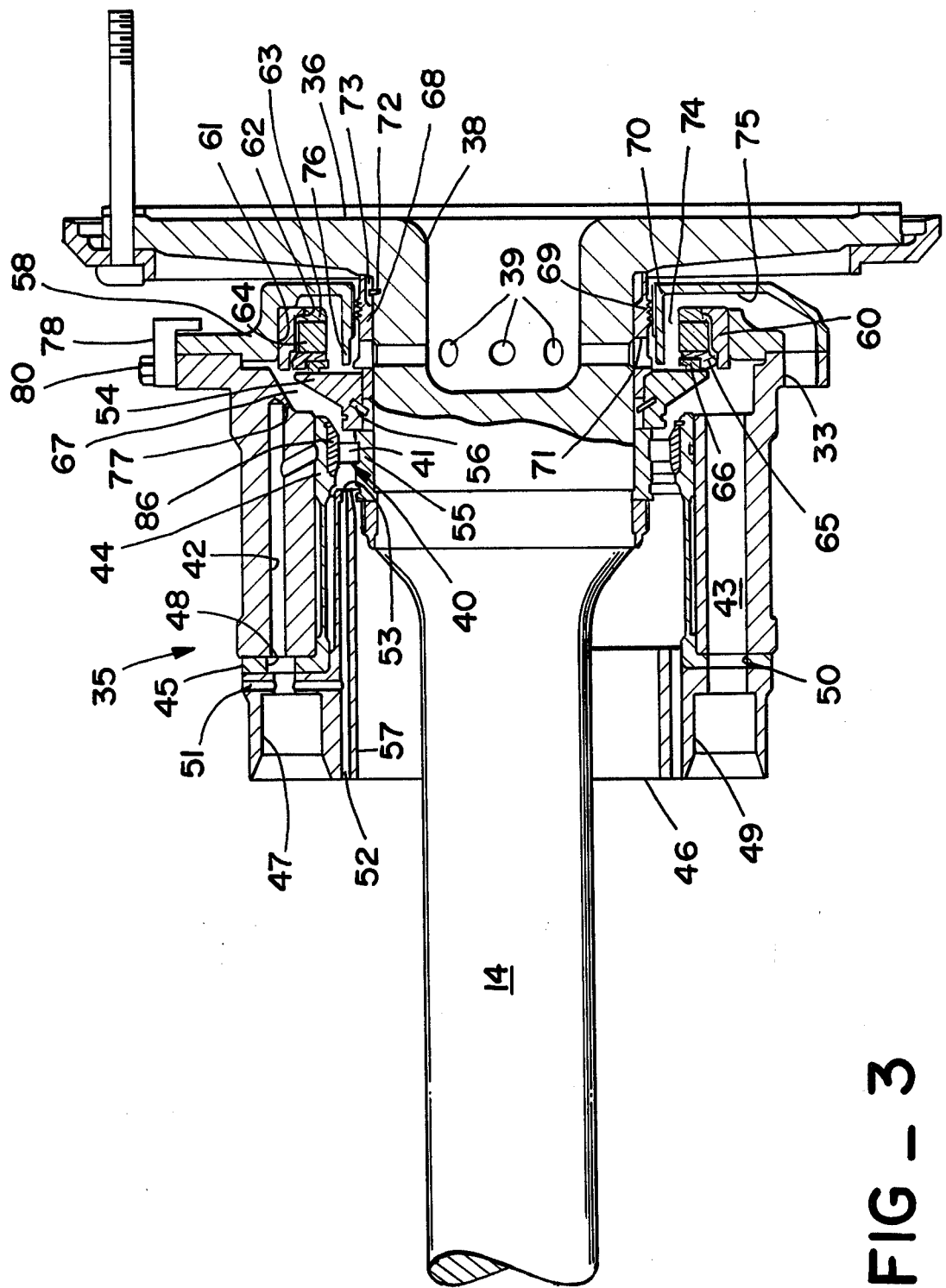
FIG. 3 illustrates the gasifier turbine shaft incorporating the principles of the invention in the gasifier bearing cage and turbine shaft assembly.

FIG. 3 and FIG. 4 illustrate two embodiments of the turbine shaft and bearing assembly 15 utilized in gas turbine 5. Particularly FIG. 3 illustrates the gasifier turbine shaft and bearing assembly found in the compressor and gasifier module while the power turbine shaft and bearing assembly is illustrated in FIG. 4. Generic similarities between the two turbine shaft and bearing assemblies will become more apparent in the discussion of the particular structure. Suffice it to say at this point, in each embodiment there exists a turbine shaft rotatably mounted in a bearing cage by a bearing. The turbine shaft has integrally formed therewith a flange which, when assembled in a gas turbine, is positioned in the turbine casing and is adapted to have mounted thereupon the turbine wheel be it the gasifier turbine or the power turbine. Disposed between the bearing and the flange are two seals. The first seal proximate the flange sealingly associates the bearing cage with the shaft and in both embodiments is a labyrinth seal. A second seal intermediate the bearing and the first seal also sealingly associates the shaft with the cage and acts in cooperation with the first seal to form an annular cavity about the shaft. In both turbine shaft and bearing assemblies, the shaft has formed proximate the end with the flange an axial cavity having radial passages communicating outwardly therefrom. Bearing cage passage means are adapted to provide lubrication fluid to the bearing and cooling fluid to the annular cavity formed between the first and second seals. The cooling fluid communicated to this annular cavity is then communicated through the radial passages in the shaft to the axial cavity located proximate the flange for use in cooling the turbine wheel.

Referring now specifically to FIG. 3 for the specific structure of a first embodiment of this invention adapted to be utilized in the gasifier turbine of a gas turbine engine, a bearing cage 35 is shown in the assembly encompassing the turbine shaft 14. Turbine shaft 14 has integrally formed therewith a flange 36 adapted to receive a turbine wheel such as a turbine wheel 16 (see FIG. 2). Turbine shaft 14 has formed therewith proximate the flange an axial cavity 38 extending inwardly of the turbine shaft. Communicating outwardly from the axial cavity are a plurality of radial passages 39. Turbine shaft 14 is adapted for installation into the accessory section (not shown) of a gas turbine to interconnect with gear driven accessories and to drive the compressor section of the gas turbine. As noted above, installation is through the turbine casing end of the compressor and gasifier module. When assembled in the form shown in FIG. 3, the bearing cage and turbine shaft may be installed as a unit, thus precluding the necessity of installing bearing seals and associated bearing retaining nuts subsequent to the installation of the turbine shaft.

Bearing cage 35 is generally cylindrical in shape and has integrally formed therewith a plurality of passages for communicating lubricating fluid to the bearings and cooling fluid to the vicinity of radial passages 39. Disposed between bearing cage 35 and turbine shaft 14 is a bearing 40 which, in the illustrated embodiment, is a roller bearing. Bearing 40 provides support for turbine shaft 14 in bearing cage 35. Support at the opposite end of turbine shaft 14 is provided in the compressor and gasifier module in a manner well within the state of the art, and it is not further discussed herein. Bearing cage 35 defines three separate passages for communication of lubrication fluid or a cooling fluid to the bearing and shaft. Specifically, an axial passage 42 communicates lubrication fluid to the flange side of bearing 40 while passage 43 communicates spent lubrication fluid from bearing 40 back to the system lubrication pump. The third passage is cooling fluid passage 33. Disposed between bearing cage 35 and bearing 40 is a bearing spring mount 44 extending axially from bearing 40 and internally of the bearing cage 35 to terminate in a radially extending flange 45. The radially extending flange is disposed between bearing cage 35 and an annular oiler 46 which defines an oil ingress socket 47 communicating with lubrication passage 42 through a bore 48 in the radially extending flange. An oil engress socket 49 is similarly defined in the annular oiler and communicates with passage 43 through a bore 50 defined in radially extending flange 45. A radial bore 51 communicates with oil ingress socket 47 to communication lubrication fluid inwardly to an axially extending passage 52 in an axial projection 57 of the annular oiler and which terminates at an orifice 53 disposed to spray lubrication fluid on the bearing 40 distal of flange 36.

Seal means are provided proximate bearing 40 to insure lubrication fluid communicated to the bearing is not communicated outwardly toward flange 36. The seal means is comprised of a rotating runner 54 associated with rotating finned labyrinth runner 68 by a key means 56. A bearing face plate 58 is removably associated with bearing cage 35 by means to be described. Bearing face plate 58 provides means against which rotating runner 54 may bear and further provides passage means for communicating cooling fluid to radial passages 39, as described above. Specifically, an annular retainer ring 60 is disposed in a bore 61 in bearing face plate 58. Annular retainer ring 60 defines an inwardly extending shoulder 62. A second ring 63 abuts shoulder 62 and retains a bellows seal 64. Positioned distally of ring 63 relative the bellows seal is a second retainer ring 65. An annular ring shaped carbon seal 66 is then disposed between retainer ring 65 and rotating runner 54 thereby sealing off and forming oil cavity 67 to which lubrication fluid is communicated by passage 42 and orifice 77 and thence to rotating runner 54, thereby cooling said runner.

Disposed about shaft 14 intermediate inner race 55 and flange 36 is a rotating finned runner 68 which forms the rotating part of a labyinth seal to be described. Rotating finned runner 68 has a plurality of outwardly extending projections 69 formed to intersect a cylindrical extension 70 of bearing face plate 58. Cylindrical extension 70 forms a labyrinth seal shroud for finned runner 68. Disposed between projection 69 and inner race 55 are a plurality of radial holes 71 in rotating finned runner 68, each radial hole 71 is lined up with a corresponding radial passage 39 in turbine shaft 14. Appropriate means are included to prevent rotation of rotating finned runner 68 relative shaft 14. In the embodiment shown, this includes a pin 72 extending into a groove 73 defined on the inside perimeter of rotating finned runner 68. Bearing face plate 58 defines in cooperation with rotating runner 54 an annular cavity 74 which communicates with radial holes 71. The bearing face plate further defines a plurality of generally radially extending passages 75 communicating at one end with cooling fluid passage 33 and at the other end with annular cavity 74. Thus, cooling fluid supplied to cooling fluid passage 33 is communicated through the plurality of radial passages to annular cavity 74 and thence through radial holes 71 and 39 to axial cavity 38 of turbine shaft 14 where such cooling fluid may be directed to cool an associated wheel 16.

Rotating finned runner 68 and the projection 69 integrally formed therewith form a labryinth type seal so that air pressure in annular cavity 74 may bleed through the labryinth seal in the conventional manner well-known in the art. Cylindrical extension 70 further defines a series of projections 76 which serve to contact rotating runner 54 in the event of misalignment during assembly thus preventing excessive compression of the associated seal 64.

The turbine shaft and bearing assembly, as depicted in FIG. 3, is in condition for installation in compressor and gasifier module 6. A plurality of assembly clips 78 are removably associated with bearing cage 35 to retain bearing face plate 58 therewith along with the various seals and retainer rings described above. Each assembly clip 78, as can be seen in FIG. 3, is retained on bearing cage 35 by a bolt 80. The plurality of assembly clips 78 are removed upon installation in compressor and gasifier module 6. The turbine shaft and bearing assembly is retained in the compressor and gasifier module by a plurality of bolts 82 (see FIG. 2) threadable through the bearing face plate 58, bearing cage 35 and into an integral portion 84 of compressor and gasifier module 6. Upon such installation in compressor and gasifier module 6, the specially configured fittings on lubrication line 28 and lubrication line 29 are adapted to be received in oil ingress socket 47 and oil egress socket 49 respectively. Similarly, cooling fluid passage 33 and bearing cage 35 are adapted to communicate with cooling fluid passage 32 in compressor and gasifier module 6.

Removal of the turbine shaft and bearing cage assembly from the compressor and gasifier module is performed in the following manner. The plurality of bolts 82 is removed followed by withdrawal of the turbine shaft 14 along with the inner race 55 of bearing 40 and the roller elements 41 thereof. Also withdrawn are the plurality of seal members and bearing face plate 58.

Remaining in the compressor and gasifier module are the bearing cage 35, the outer race 86, bearing spring mount 44 and oiler 46. Reinstallation of assembly clip 78, coupled with the use of a puller type tool, would remove the entire turbine shaft and bearing assembly. In the event the bearing 40 is separated, as described in the initial disassembly process, the bearing cage itself can be removed from the compressor and gasifier module by puller screws. Reassembly of the bearing cage assembly and turbine shaft may take place on a bench arrangement with installation of the entire assembly occurring as a unit as described above.

DESCRIPTION OF A SECOND EMBODIMENT ADAPTED FOR USE IN THE POWER SECTION

In the description that follows of a turbine shaft and bearing assembly adapted for use in a power section, components which are substantially identical to that just described in relation to the gasifier turbine are denoted by primed numbers identical to the number used in the gasifier section for the same part. Those parts which are similar have been given new numbers, however the same terminology will be used in respect to the power turbine.

Power turbine shaft 26 has integrally formed at one end a flange 36' to which a turbine wheel 22 may be affixed by appropriate means well-known in the art. Power turbine shaft 26 defines at the flanged end an axial cavity 102 which corresponds to axial cavity 38 of the gasifier turbine. In the particular embodiment illustrated in FIG. 4, power turbine shaft 26 is utilized to drive the sun gear 104 of a planetary gear section 24 shown in part in FIG. 2. The planetary sun gear 104 is internally splined by a spline connection 106 to power turbine shaft 26 and retained there by bolt means 108 and spacer 110 which affix the planetary sun gear with the power turbine shaft and allow a certain degree of axial and radial movement necessary in driving a planetary system 24 such as depicted in FIG. 2.

In order to rotatably associate power turbine shaft 26 with the power section 10, an assembly similar to that depicted in FIG. 3 and described above relating to the gasifier turbine is utilized. A bearing cage 112 forms the main support element which is slidably received in power section 10 and retained there by a plurality of bolts 114 (see FIG. 2), which pass through a plurality of bores 115 (see FIG. 5). Affixed to the end of bearing cage 112 proximate flange 36' is a bearing face plate 117 which is retained with bearing cage 112 by a plurality of bolt means 118. The bearing face plate serves to retain the plurality of non-rotating elements of the labryinth seal and oil seal. In particular, the bearing face plate includes a cylindrical extension 119 which serves as a labryinth seal shroud for a rotating finned runner 68'. In addition, bearing face plate 117 retains annular retainer ring 60' which with its shoulder 62' retains a second retainer ring 63', a bellows seal 64', a retainer ring 65' and a carbon seal 66'. Fixedly associated with power turbine shaft 26 by means of a pin member 72' is the rotating finned runner 68' which carries with it the runner 54' through the use of key means 56'. Just as before described, the rotating runner 54' and the labryinth seal formed by rotating finned runner 68' form an annular cavity 74' to which cooling fluid such as compressed air may be supplied for communication through a plurality of radial bores 71' communicating with a plurality of radial bores 39' in power turbine shaft 26 and thence to axial cavity 102.

Bearing cage 112 is formed with a plurality of passages 121 which communicates cooling fluid to axial cavity 74' (see also FIG. 5). Bearing cage 112 further defines a plurality of lubrication fluid passages 123. Lubrication fluid passages 123 communicate lubrication fluid to the rotating runner 54' through an orifice 126. Bearing means 125 is disposed between bearing cage 112 and power turbine shaft 26 proximate rotating runner 54' to rotatably support power turbine shaft 26 in bearing cage 112. A branch passage 128 associated with lubrication fluid passage 123 communicates lubrication fluid to an oiler 127 which lubricates the bearing means 125.

Bearing means 125 in this embodiment utilizes a plurality of ball bearings 130 rotatably retained between an outer race 132 and a split inner race having a first member 133 and a second member 134. A bearing spring mount 135 is disposed between outer race 132 and bearing cage 112 and retained in bearing cage 112 along with oiler 127 by a plurality of bolt means 140. Outer race 132 is retained in bearing spring mount 135 by nut 137, while the first and second members of the inner race are retained on power turbine shaft 26 by a nut 142. Provision for return of lubrication oil to a sump or pump is included in a lubrication fluid passage 144 integrally formed with bearing cage 112.

In the power turbine embodiment, additional bearing support is provided at the end of shaft 26 opposite flange 36' by a roller bearing means 151 affixed in bearing cage 112. It is to be understood that the end of shaft 26 distal from the flange could be supported equally as well by a bearing means carried by power section 10 just as shaft 14 is supported at its distal end by a bearing carried in compressor and gasifier module 6. Bearing 151 is retained in rotating relationship with shaft 26 by a bearing retainer plate 153 affixed to bearing cage 112 by appropriate bolt means 154. Various passages 155 in bearing plate 153 are provided for communication with the bearing and shaft for lubrication purposes and for determining the rotational speed of shaft 26.

Bearing cage 112 is provided with a plurality of annular grooves formed about the perimeter thereof distal of bearing face plate 117. In particular, a cooling fluid groove 156 and a lubrication fluid groove 158 are provided. Sealing grooves 160, three in number, sealingly separate cooling fluid groove 156 and lubrication groove 158 one from the other when the bearing cage is installed in the power section and provide a seal to prevent loss of either cooling fluid or lubrication fluid from the assembled arrangement. It is to be understood that appropriate seals are placed in grooves 160. Cooling fluid groove 156 communicates with cooling fluid passage 121 while lubrication fluid groove 158 communicates with lubrication fluid passage 123.

Referring now to FIG. 2, the power turbine shaft and bearing assembly is shown installed in the power section of the turbine. It is pointed out that upon installation lubrication fluid groove 158 is in communication with a matching annular groove 163 in power section 10 to which lubrication fluid is supplied through conduit 30. Similarly cooling fluid is communicated to cooling fluid groove 156 through a conduit 31 and a matching groove 164 in power section 10.

Assembly of the power turbine section is identical to that of the gasifier turbine described above, with positioning of the assembly in the power section as a unit and finally installation of retaining bolts 114. Withdrawal of the power turbine is accomplished by removal of bolts 114 wherein the entire assembly including the sun gear 104 is withdrawn as a unit.

Although this invention has been described relating to two specific embodiments, it is to be understood that other embodiments incorporating various changes or modifications within the skill of the art are to be considered within the scope of this patent.

What is claimed is:

1. In a gas turbine having a turbine section and a casing, the turbine section having a first end and a second end said turbine section removably fixably associatable with said casing at its first end and lubrication conduit means, a turbine shaft and bearing assembly comprising:
 a shaft defining a turbine wheel mounting flange at one end, said flange adapted for mounting a turbine wheel;
 a bearing assembly for rotatably fixing said shaft in said turbine section at its first end;
 said bearing assembly comprising; a bearing cage removably fixable axially in said first end of said turbine section; bearing means rotatably affixing said shaft in said bearing cage; lubrication fluid passage means for providing lubrication fluid to said bearing means; lubrication fluid socket means formed with said bearing cage for sealingly receiving fluid from said lubrication conduit means to communicate fluid to said lubrication fluid passage means; first seal means for sealingly associating said shaft with said cage; second seal means for sealingly associating said shaft with said cage; said first and said second seal means disposed between said bearing means and said flange and forming an annular cavity therebetween; and means for providing cooling fluid to said annular cavity.

2. The turbine shaft and bearing assembly set forth in claim 1 wherein said first seal means comprises a rotating finned runner fixedly associated with said shaft, and a cylindrical shroud means associated with said bearing cage means, the rotating finned runner and the cylindrical shroud means forming a labryinth type seal.

3. The turbine shaft and bearing assembly as set forth in claim 2 wherein said bearing cage means comprises a bearing cage and a bearing face plate removably fixedly associated with said bearing cage proximate said flange, and further wherein the cylindrical shroud means forming a portion of the labryinth seal is a cylindrical extension integrally formed with said bearing face plate, and wherein the second seal means comprises a rotating runner fixedly associated with the shaft, and a fixed seal means associated with said bearing face plate, said rotating runner bearing against said fixed seal means.

4. The turbine shaft and bearing assembly as set forth in claim 3 wherein the shaft defines an axial cavity proximate the flange, and further defines a plurality of radial ports extending outwardly from said axial cavity, and further wherein the rotating finned runner defines a plurality of radial ports communicating with the aforesaid radial ports to interconnect the annular cavity with said axial cavity.

5. The turbine shaft and bearing assembly as set forth in claim 4 wherein said bearing means comprises a roller bearing including an inner race, a plurality of rollers and an outer race, said inner race fixedly associated with said turbine shaft and said outer race fixedly associated with said bearing cage; said roller bearing separable, with said outer race retained with said bearing cage and said inner race and said plurality of bearings being retained with said shaft.

6. The turbine shaft and bearing assembly as set forth in claim 5 further comprising a plurality of clip means, said plurality of clip means for temporarily retaining the bearing face plate with the bearing cage whereby said clip means are removable upon installation of the turbine shaft and bearing assembly in the gas turbine housing.

7. The turbine shaft and bearing assembly as set forth in claim 1 wherein the means for providing cooling fluid includes first ingress means for receiving cooling fluid and the lubrication fluid socket means includes second ingress means for receiving lubricating fluid from said turbine casing while said bearing cage means is fixed in said casing;
 and wherein the bearing cage means defines first passage means for communicating cooling fluid from said first ingress means to said annular cavity;
 and further wherein the bearing cage means defines second passage means for communicating lubricating fluid from said second ingress means to said bearing means;
 and further wherein said bearing cage means defines third passage means for communicating lubricating fluid away from said bearing means.

8. The turbine shaft and bearing assembly as set forth in claim 7 further comprising an oiler assembly associated with said bearing cage means and defining an oil ingress socket and an oil egress socket, said oil ingress socket forming a portion of the second ingress means and said oil egress socket communicating with the third passage means, said oil ingress socket and said oil egress socket adapted to sealingly receive conduit means communicating lubrication fluid to and from said bearing cage means.

9. The turbine shaft and bearing assembly as set forth in claim 4 wherein said bearing means comprises a ball bearing including a plurality of spherical balls, a split inner race having a first portion and a second portion each associated with said turbine shaft and an outer race fixedly associated with said bearing cage, said ball bearing separable with the first portion of said inner race retained with said shaft; and the outer race, the plurality of balls, and the second portion of said inner race retained with said bearing cage.

10. The turbine shaft and bearing assembly as set forth in claim 9 wherein the bearing means further comprises a second bearing means annularly disposed between said shaft and said bearing cage rotatably fixing the end of said shaft opposite said flange in said bearing cage.

11. The turbine shaft and bearing assembly as set forth in claim 10 wherein said second bearing means comprises a roller bearing assembly.

12. The turbine shaft and bearing assembly as set forth in claim 11 wherein the means for providing cooling fluid includes first ingress means for receiving cooling fluid and wherein the lubrication fluid socket means includes second ingress means for receiving lubricating fluid from said turbine casing while said bearing cage is fixed in said casing and said bearing cage further defines first passage means for communicating cooling fluid from said first ingress means to said annular cavity;
 and said bearing cage further defines second passage means for communicating lubricating fluid from said second ingress means to said ball bearing;

and said bearing cage further defining third passage means for communicating lubrication fluid away from said ball bearing.

13. The turbine shaft and bearing assembly as set forth in claim 12 wherein said bearing cage is substantially cylindrical in shaped and defines therearound a first annular groove forming a portion of the first ingress means, said annular groove adapted to communicate with a source of cooling fluid in said turbine housing, and further wherein said bearing cage defines a second annular groove which comprises a portion of the second ingress means, said second annular groove communicating with a source of lubricating fluid in said turbine housing.

14. The turbine shaft and bearing assembly as set forth in claim 13 wherein the bearing cage further defines a plurality of annular seal means, said plurality of annular seal means sealingly associating said first and second annular groove with said turbine housing while said bearing cage is affixed in said turbine housing.

15. The turbine shaft and bearing assembly as set forth in claim 1 further comprising lubrication fluid return passage means for communicating lubrication fluid from the bearing.

UNITED STATES PATENT OFFICE
CERTIFICATE OF CORRECTION

Patent No. 4,086,759          Dated May 2, 1978

Inventor(s) Karl W. Karstensen et al.

It is certified that error appears in the above-identified patent and that said Letters Patent are hereby corrected as shown below:

Figure 4 is amended to properly show passages 123, and 121. Additionally, nut 142 has been changed to show the threaded relationship. (see attachment)

*Signed and Sealed this*

*Twenty-seventh* Day of *February 1979*

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,086,759　　　　　　　　　Dated May 2, 1978

Inventor(s)　Karl W. Karstensen et al.

It is certified that error appears in the above-identified patent and that said Letters Patent are hereby corrected as shown below:

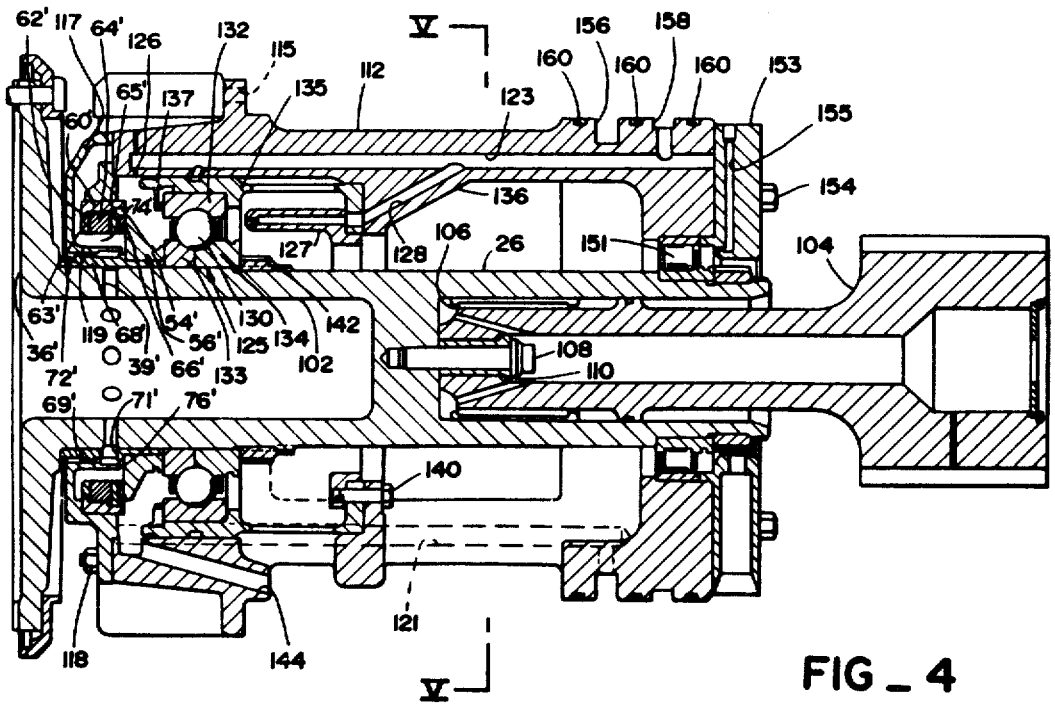

FIG_4